Nov. 29, 1938.  E. H. PIRON  2,138,506
WHEEL
Filed April 8, 1935
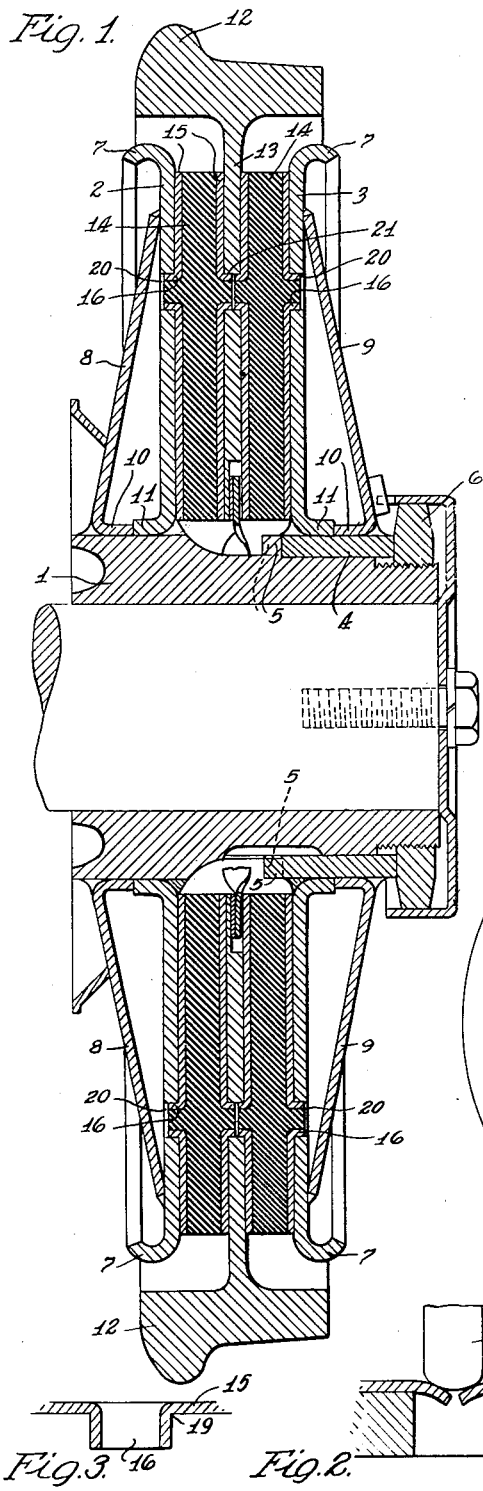
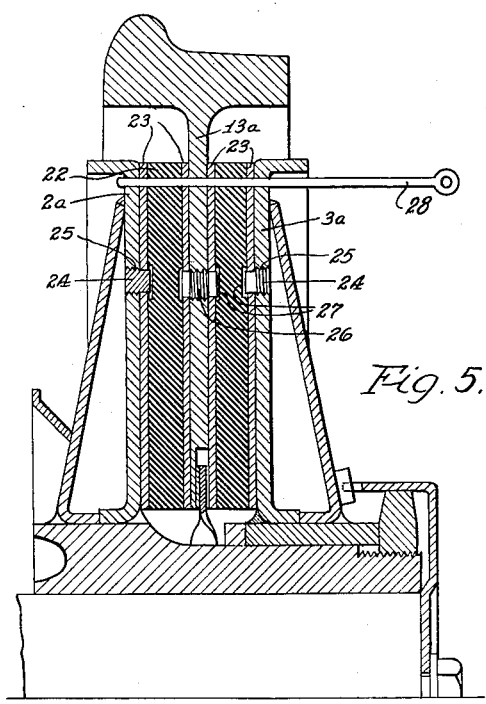
INVENTOR.
Emil H. Piron
BY
ATTORNEY.

Patented Nov. 29, 1938

2,138,506

UNITED STATES PATENT OFFICE 2,138,506

WHEEL

Emil H. Piron, New York, N. Y., assignor, by mesne assignments, to Transit Research Corporation, New York, N. Y., a corporation of New York Application April 8, 1935, Serial No. 15,151

10 Claims. (Cl. 295—11)

This invention relates to resilient wheels particularly adapted for use on rail vehicles, of the type wherein a metallic tire is supported by rubber discs in shear.

It is well understood in the art that a rail wheel is given a driving fit with its axle so that when the wheel is removed for re-surfacing of its tread it is a difficult and expensive matter to replace the wheel on its hub in exact accordance with its original alinement. Resilient wheels of the general type herein described have been suggested in numerous prior patents and some of them have, in fact, been built but they too are also subject, for the most part, to the drawback that they must be bodily removed from their axle for resurfacing of the tread and for replacement of the rubber. Research by applicant indicates that commercial success can be attained with wheels of this type only by providing a wheel comprising a hub portion integral with one main radial metallic shear plate and the remainder of the wheel including the other main radial plate, the rubber discs and the tire carrying member all readily demountable therefrom without removing the hub portion from the axle. This entails means to exactly center the rubber elements with respect to the hub, means for exactly centering the tire carrying member with respect to the rubber elements and the hub for if the assembly is not exact it is obvious that the tire will be eccentric with respect to its axis of rotation, and means capable of preventing relative dislocation of the several members during severe operation.

A principal object of the present invention is to teach the construction of a wheel meeting the foregoing requirements with an essential consideration residing in the use of auxiliary metallic plates bonded to each side of each rubber element and provided with novel dowel or locating means which are also transmitting means for both radial and tangential loads.

Another and important object is to provide a wheel of the type described which will be as light as possible and, hence, which has its radial plates made of sheet metal. In order to obtain the desired strength it is necessary to provide effective rigidifying means and a specific object is to teach how to obtain acceptable and sufficient strength with sheet metal to warrant its adoption in wheels for the most difficult classes of service.

Another object is to provide means for readily assembling a wheel of this type wherein the inner elements can not be readily seen for accurate placement.

Other objects and advantages will become hereinafter more fully apparent as reference is had to the accompanying drawing wherein my invention is illustrated and in which;

Figure 1 is a transverse diametric section through a rail wheel constructed in accordance with my invention, Figure 2 is a detail showing one method of making the dowel pins, Figure 3 is a detail showing the completed dowel made by this method, Figure 4 is a view in reduced size showing a dowel side surface of one plate, and Figure 5 is a view similar to Figure 1 showing a modified form of the invention.

1 indicates the wheel hub having two stiff plates 2 and 3 radiating therefrom. The plate 2 is integrally secured to the hub 1, as by welding, and the plate 3 is integrally secured to a collar 4 slidably mounted on the hub 1. Teeth or clutch elements 5 lock the collar for rotation with the hub and a nut 6 threaded onto the hub 1 retains the clutch elements 5 in engagement. It is highly desirable to build the plates 2 and 3 out of sheet metal and in order that sufficient rigidity may be obtained the outer edge 7 of each plate is flared outwardly to form a stiffening flange and may suitably be formed on the arc of a small circle as indicated in Figure 1 or substantially normal to the main surface as shown in Figure 5, or of other suitable shape. As a further stiffening means, conical bracing plates 8 and 9 are provided, the plate 8 being welded at its outer edge to the plate 2 and the outer edge of the plate 9 being welded to the member 3. The inner edges of both plates 8 and 9 are turned inwardly at 10 for close fitting engagement with the hub 1 and collar 4 respectively, the inner edges of each plate 2, 3 being turned outwardly at 11 to serve as an abutting means therefor. The plates 8 and 9 are preferably welded to the hub and collar respectively.

The tire 12 is integral with a radial plate member 13 of substantially greater inside diameter than the outside diameter of that portion of the hub 1 which it encircles so as to be capable of radial movement with respect thereto.

In order to support the tire 12 and plate 13, elastic springing elements are interposed between the plate 13 and each plate 2 and 3. The wheel as described to this point is similar except for the addition of the flanges 7, to that revealed in the co-pending application of C. F. Hirshfeld, Serial Number 749,499 filed October 22, 1934. The springing elements, the method of making them and the manner of wheel assembly are novel thereover.

The springing elements are each composed of a ring of elastic material 14, such as rubber, having opposed flat faces to each of which is surface bonded a plate or disc 15 of some stiff suitable material such as metal.

The plates 15 are pierced at a plurality of points and then punched to draw the metal into a plurality of projections 16, as indicated in Figures 2 and 3. A rounded punch 17 is preferably used with the die 18 so that as the metal is drawn the outer edge 19 of the draw is given a very small radius. The projections 16 are thus suitable for use as dowels and the plates 15 will contact with the inner surfaces of the plates 2 and 3 when the dowels are inserted into openings 20 provided therefor.

The plates 15 are punched and drawn before the rubber is bonded thereto. The rubber may be cold bonded thereto or vulcanized while in contact therewith or simply vulcanized thereto.

As shown in Figure 4, the dowels 16, and hence the holes 20, are preferably uniformly spaced and symmetric as to adjacent or opposite segments. This is highly desirable for the reason that the parts of the wheel are heavy and the dowels can not be seen for interfitting so that any dowel 16 should fit any hole 20. Holes 21 of similar size and spacing are provided in the plate 13, this plate being of sufficient thickness that two opposed dowels may be inserted therein with a slight amount of clearance therebetween so that they will not be in pressure contact.

The dowels 16 fit snugly into their holes 20 but are not tight to the extent of a driving fit. In other words, it is desired that the wheel parts may be readily disassembled from the hub 1 and plate 2 without requiring removal of the hub 1 from its axle. This can be accomplished by removal of the nut 6, then the collar and plate assembly 4, 3, 9, then one spring 14, 15, the plate 13, and the other spring 14, 15.

The wheel of Figure 5 is similar to that of Figure 1 with the exceptions hereinafter noted. The springing elements are composed of rubber discs 22 having plates 23 surface bonded thereto, thus forming dowel holes rather than dowel pins. Dowel pins 24 must therefore project from the surfaces of the plates 2ª and 3ª for engagement therewith. These pins 24 are preferably threaded at one end for engagement with similar threads in the dowel holes 25 of the plates. The pins 26 for the plate 13ª are threaded at their midsection and extend outwardly from each surface of the plate for engagement with plates on each side thereof. Note that the pins 24 and 26 preferably extend entirely through the plates 23 and that the rubber discs are hollowed out at 27 to prevent chafing. The advantage of this construction is that if one or more dowels is sheared off, perchance, it can be replaced.

In both forms of springing elements the dowel pins constitute the means for transmitting both radial and tangential forces or loads. In other words, friction between the springing element plates and the main plates is not relied upon because slippage of even a fraction of an inch will render the wheel unfit for service.

In order to further facilitate the assembling operation, I recommend the use of one or more assembly pins 28 upon which the individual parts may be "threaded". The plates 2ª, 3ª, 13ª and the springing elements are each provided with small holes 29 for the purpose so that before the members are in contact the pins 28 are inserted through them so that when the members are thus pressed toward each other the dowels go into place. Even without the pin 28, the holes 29 can be used for visually alining the plates. Removable plugs may be placed in the holes 29 of the exterior members for normal operation. With this assembly means it is obvious that the dowel or stud members do not have to be symmetrical and uniformly spaced to be able to readily assemble the wheel but it is recommended that they be so positioned because of other obvious considerations.

When the tread surface of a resilient wheel is ground it has been found that the surface may not be truly round unless resiliency of the rubber springing elements is first obviated. In other words, the tire must be held rigidly with respect to the hub during grinding. The holes 29 and the pins 28 lend themselves for use for this purpose as it is obvious that there can be no radial movement of the tire with respect to the hub when the pins are in place and the wheel is normally assembled. As a matter of fact the pins for grinding would not be exactly the same as the assembly pins as they may be shorter and a cotter pin or nut would be provided to prevent their displacement during rotation for the grinding.

The holes 29 may be at any desired radial distance from the inner to the outer circumference of the rubber elements. They are illustrated as being outwardly of the conical plates but they do not have to be as these plates may be punched also. The position illustrated is preferred.

What I claim is:

1. In a rail wheel, a hub portion, two parallel spaced plates thereon and relatively movable axially of said hub portion, a third plate for supporting a tire residing between said two plates, spring means separating said third plate and each of said two plates and each comprising a circular mass of elastic material having opposed parallel surfaces, a metallic disc surface-bonded to each of said surfaces, and dowel means integral with each of said discs, said plates provided with companion dowel means therein, said dowel means accurately and freely fitting said companion dowel means and constituting centering and load transfer means, and a nut threadable on said hub portion for drawing said two plates toward each other to maintain said dowel and companion dowel means in operative engagement.

2. The combination as set forth in claim 1 together with cover plates for said companion dowel means extending from said hub portion to a radius beyond said companion dowel means, said cover plates also comprising bracing means for rigidifying said two parallel plates.

3. The combination as set forth in claim 1 together with a pair of cover plates for said companion dowel means, said cover plates being of frusto conical appearance and oppositely faced and extending from said hub portion to each of said plates and being securely fixed to said hub portion at their smaller diameters and to said plates at their larger diameters to also constitute bracing means for said plates.

4. In a rail wheel, a hub portion threaded at one end and having a circular plate extending radially from the other end thereof and fixed thereto, a second plate slidably axially of and mounted on said hub portion parallel with the first named plate, a third circular plate integral with a tire between said first and second plates, spring means separating said third plate from said first and second plates, said spring means each comprising a circular mass of elastic material having opposed parallel surfaces, a metallic disc surface-bonded to each of said surfaces, hollow cylindrical integral projections arising from the exterior surfaces of each of said discs and spaced uniformly from the center thereof, said plates each being perforated to receive said projections, said projections and said perforations being so arranged and so spaced that there are as many possible relative positions of fit as there are projections, said perforations and projections being also so arranged and spaced as to constitute centering means to position said elastic means and said discs co-axially with said plates and said hub portion, and a nut threadable on said hub portion for drawing said first and second plates toward each other to maintain said projections and said perforations in operative association.

5. In a wheel, a hub portion having two relatively spaced circular plates radiating therefrom, a third plate directly connected to a tire and residing between said two plates, elastic springing elements separating said third plate from each of said two plates for supporting said hub portion from said tire in resilient shear, said two plates being of sheet metal and each having the free outer edges thereof extending outwardly and forming a rigidifying flange, and further rigidifying means comprising a pair of plates of frusto conical shape oppositely faced with each of said plates being rigidly secured to said hub portion at its smaller base and to one of said plates at its larger base.

6. In a wheel, a hub portion having two relatively spaced circular plates radiating therefrom, a third plate directly connected to a tire and residing between said plates, spring means separating said third plate from each of said two plates and supporting said hub portion from said third plate and tire in resilient shear, said spring means each comprising a circular mass of rubber having opposed flat surfaces, metallic discs bonded to said surfaces, said discs each having hollow integral dowels projecting from the exposed surfaces thereof with said dowels being symmetrically arranged with respect to said discs, said plates each being perforated to receive said dowels as a centering means for said masses of rubber with respect to the axis of said hub, said two plates being made of thin metal flared at their outer edges as rigidifying means, an additional rigidifying means for said thin metal plates comprising frusto conical plates oppositely faced and having their smaller diameters integrally connected to said hub portion and their larger diameters each integrally connected to one of said plates, said larger ends being radially outward of said dowel holes whereby said conical plates also constitute cover plates for perforations through said plates.

7. In a wheel, a hub portion having two relatively spaced circular plates radiating therefrom, a third plate directly connected to a tire residing between said two plates, elastic springing means separating said third plate from each of said two plates for supporting said hub portion from said tire in resilient shear, said springing means each comprising rubber discs and thin stiff plates surface-bonded one to each face of each of said discs, a plurality of companion stud and cavity means for each of said plates equally spaced from each other and at equal distances radially from the center of the wheel, said stud and cavity means comprising means for transmitting radial and tangential loads from said tire to said hub portion, said two plates each being flanged at their outer free edges as rigidifying means, and further rigidifying means comprising oppositely faced conical plate members each attached at their larger base to one of said two plates and each attached at their smaller base to said hub portion.

8. In a wheel, in combination, a tire carrying member supported by rubber in shear, opposed plate members on each side of the tire carrying member, springing elements between said tire carrying member and each of said plate members comprising rubber discs and thin stiff plates bonded one to each face of each of said discs, said tire carrying member and said plate members each having a plurality of openings therein and studs integral with and projecting outward from each of said plates for insertion into said openings, said studs comprising the means for transmitting radial and tangential loads to and from said rubber discs.

9. In combination, a circular spring device rotatable about an axis comprising parallel relatively moving load imposing and load receiving plate members, elastic springing means therebetween adapted to have imposed thereon a shear loading from said plate members from different directions radially of said axis, relatively thin stiff members bonded to each side of the elastic means residing between said elastic means and each of the plate members and companion dowel means integral with said plate members and said stiff members, said companion means accurately interfitting to constitute exact centering and anchoring means for said elastic means as well as load transfer means between said members and said elastic means.

10. In combination, a spring device, rotatable about an axis and comprising relatively moving load imposing and load receiving plate members, elastic springing means therebetween adapted to have imposed thereon a shear loading from said plate members from a constantly changing direction radially of said axis, relatively thin stiff members bonded to each side of the elastic means and residing between said means and each of the plate members, said stiff members each having dowel means integral therewith and extending into said plate members for surface contact between said stiff members and said plate members, said dowel means constituting means for centering said elastic means about its axis of rotation and means for transferring the loading from said plate members to said elastic means.

EMIL H. PIRON.